United States Patent
Bohrer et al.

(10) Patent No.: US 8,869,522 B2
(45) Date of Patent: Oct. 28, 2014

(54) DRIVE SYSTEM FOR AN INFEED CONVEYOR OF A HARVESTER

(75) Inventors: Stefan Bohrer, St. Wendel (DE); Konrad Rossbach, Kammeltal (DE)

(73) Assignee: Deere & Company, Moline, IL (US)

( * ) Notice: Subject to any disclaimer, the term of this patent is extended or adjusted under 35 U.S.C. 154(b) by 962 days.

(21) Appl. No.: 13/003,447

(22) PCT Filed: Jul. 7, 2009

(86) PCT No.: PCT/EP2009/058636
§ 371 (c)(1),
(2), (4) Date: May 5, 2011

(87) PCT Pub. No.: WO2010/003966
PCT Pub. Date: Jan. 14, 2010

(65) Prior Publication Data
US 2012/0067037 A1   Mar. 22, 2012

(30) Foreign Application Priority Data

Jul. 11, 2008 (DE) .......................... 10 2008 040 357
May 6, 2009 (DE) .......................... 10 2009 002 849

(51) Int. Cl.
*A01D 75/18* (2006.01)
*A01D 41/127* (2006.01)

(52) U.S. Cl.
CPC .......... *A01D 41/1274* (2013.01); *A01D 75/187* (2013.01)
USPC .............................. 60/490; 60/403; 56/10.2 J

(58) Field of Classification Search
CPC ...... F15B 20/00; F15B 20/007; F16H 61/421; F16H 61/431; F16H 39/14; F16H 61/478; A01D 75/18; A01F 12/16

USPC ............ 60/403, 445, 490; 56/10.2 J; 460/2, 3
See application file for complete search history.

(56) References Cited

U.S. PATENT DOCUMENTS

| | | | | |
|---|---|---|---|---|
| 4,034,918 A * | 7/1977 | Culbertson et al. | ............. | 60/403 |
| 4,858,435 A * | 8/1989 | Ikeda | ............... | 60/490 |
| 5,901,535 A * | 5/1999 | Duckinghaus et al. | .... | 56/10.2 G |
| H1977 H * | 8/2001 | Poorman | ........................ | 60/445 |
| 7,022,012 B2 * | 4/2006 | Heinsey et al. | .................. | 460/2 |
| 7,140,169 B2 * | 11/2006 | Ameye et al. | ............... | 56/10.2 J |
| 7,464,525 B2 * | 12/2008 | Dueckinghaus et al. | ... | 56/10.2 J |
| 7,721,515 B2 * | 5/2010 | Pollklas et al. | ............. | 56/10.2 J |
| 8,438,846 B2 * | 5/2013 | Ohtsukasa | ...................... | 60/490 |
| 8,646,263 B2 * | 2/2014 | Shirao | ............................ | 60/490 |

FOREIGN PATENT DOCUMENTS

WO         0209498 A      2/2002

* cited by examiner

*Primary Examiner* — Thomas E Lazo

(57) ABSTRACT

The invention relates to a drive system for an infeed conveyor (22) of a harvester (10), having an adjustable hydraulic pump (66), the flow rate and flow direction of which can be adjusted by means of a first actuator (76), said hydraulic pump being connected to a hydraulic motor (68) which drives the infeed conveyor (22). A controller (70) is connected to a foreign-body detection device (108) and to a first valve (90) for controlling the actuator (76) that controls the hydraulic pump (66). The controller (70) controls the first valve (90) at least for a short time by reversing the flow direction is a foreign body appears. In addition, it is suggested that the hydraulic motor (68) has an adjustable displacement volume, and that the controller (70) increases the hydraulic motor displacement volume (68) is a foreign body appears.

2 Claims, 2 Drawing Sheets

DRIVE SYSTEM FOR AN INFEED CONVEYOR OF A HARVESTER

PRIOR ART

Figure 1:
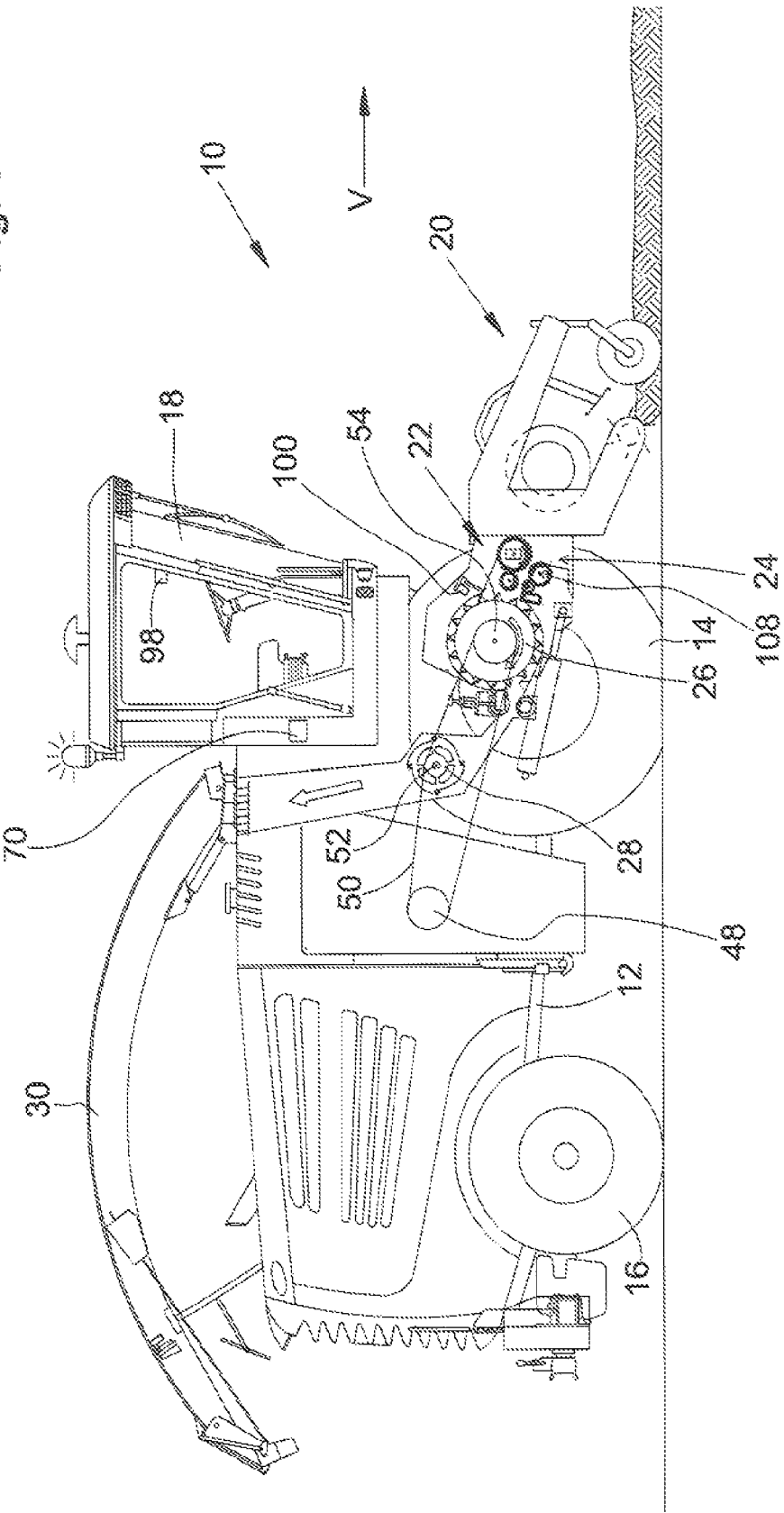

In agricultural harvesters, it can occur that foreign objects are picked up from the field in addition to the crop material and conveyed into the harvester, wherein these foreign objects on the one hand can damage or destroy components of the harvester and on the other hand are undesirable in the crop material because they can lead to unwanted consequential damage when the crop material is processed or fed to animals. It is therefore common practice to arrange foreign object detectors on the infeed channel of the harvester or upstream thereof, wherein these detectors stop the infeed of the harvester so fast when a foreign object is detected that the harvester cannot suffer damage and the foreign object can be removed from the crop material. Foreign object detectors of this type operate, for example, on the basis of induction in order to detect ferromagnetic foreign objects (see, for example, DE 199 12 407 A1), detect the abruptly increasing layer thickness of a crop material mat during the infeed of a foreign object (DE 10 2006 043 373 A1) or detect noises created by hard foreign objects when they impact on rollers or other elements of the harvester or a harvesting attachment (DE 10 2006 003 100 A1).

In order to stop the infeed conveyor within the relatively short time required to protect the harvester, it is common practice to utilize catches that are actuated by means of an electromagnet or a hydraulic cylinder when a foreign object is detected and engage a gearwheel that is connected to the infeed conveyor in a rotationally rigid fashion (see DE 199 55 901 A and the state of the art cited therein), wherein a clutch in the drive train of the infeed conveyor is disengaged at the same time or shortly before this engagement takes place. The clutch, the gearwheel, the catches and their drive are relatively elaborate.

It has also been proposed to drive the infeed conveyor hydraulically by utilizing a hydraulic pump that is driven by the internal combustion engine of the harvester, as well as a hydraulic motor that drives the infeed conveyor and is connected to the hydraulic pump via a hydraulic fluid conduit. In this respect, we refer to CH 554 132 A5. DE 33 41 071 A1, WO 01/65919 A1, WO 02/09498 A1 and EP 1 721 518 A1. When a foreign object is detected, the hydraulic motor and therefore the infeed conveyor is switched off by means of a valve that is arranged between the hydraulic pump and the hydraulic motor, wherein said valve is controlled manually according to CH 554 132 A5 and by means of the foreign object detector according to the other cited publications. In WO 02/09498 A1, it is proposed to also set the electro-hydraulically adjustable hydraulic pump to zero when a foreign object is detected such that no hydraulic fluid flows through a bypass line, through which the valve switched into a stop position otherwise diverts the flow of hydraulic fluid arriving from the pump. According to WO 01/65919 A1, WO 02/09498 A1 and EP 1 721 518 A1, the infeed speed is adjusted by adjusting the hydraulic pump while the displacement of the hydraulic motor is fixed. In hydraulic drives of infeed conveyors, in which the flow of hydraulic fluid is switched off by the hydraulic motor when a foreign object is detected, the complexity of the valves for realizing an emergency stop of the hydraulic motor is considered disadvantageous.

OBJECTIVE OF THE INVENTION

The invention is based on the objective of making available a drive system for an infeed conveyor of a harvester that makes it possible to switch off the infeed conveyor in a simple yet effective fashion when a foreign object is detected.

SOLUTION

According to the invention, this objective is attained with the characteristics of Claims 1 and 8, wherein the characteristics disclosed in the remaining claims serve for realizing advantageous additional developments of the inventive solution.

A drive system for an infeed conveyor of a harvester comprises a hydraulic pump with variable flow rate and flow direction. The hydraulic pump usually can be mechanically driven by an internal combustion engine and is connected to a hydraulic motor that in turn mechanically drives the infeed conveyor via a hydraulic fluid conduit. A control is connected to a foreign object detector and a first valve that controls an actuator for adjusting the flow rate and the flow direction of the hydraulic pump. When a foreign object is detected by the foreign object detector, the control at least briefly controls the first valve in the sense of a reversal of the flow direction.

Due to these measures, the hydraulic pump is switched to the zero position very fast and then only delivers a minimal quantity of hydraulic fluid to the hydraulic motor such that this motor no longer can considerably turn in the conveying direction, but rather stops instantly such that the foreign object cannot cause any damage to the harvester. The actuator and the valve preferably operate electro-hydraulically although it would also be conceivable to provide an actuator in the form of an electromagnet and a valve in the form of an electronic switch (e.g., transistor, thyristor or relay) for electrically controlling the electromagnet.

The control preferably controls the first valve in the sense of a reversal of the flow direction for such a period of time that the hydraulic motor immediately stops, but does not turn in the opposite direction. In this case, it is conceivable, but not absolutely imperative, that the (electro-hydraulic) valve is actually adjusted beyond the neutral position or (in case of an electro-hydraulic or electro-mechanic control) the hydraulic pump delivers a flow of hydraulic fluid to the hydraulic motor that is directed opposite to the flow direction in the harvesting mode. It would furthermore be possible to continuously drive the hydraulic motor backward after the foreign object detector responds in order to transport the foreign object out of the infeed of the harvester again, wherein it would also be necessary, if applicable, to reverse the harvesting attachment in this case (see EP 0 904 684 A1).

In one preferred embodiment of the invention, the first actuator consists of a double-action hydraulic cylinder that is connected to a valve, wherein this valve can preferably be switched into a first position, in which the hydraulic motor rotates in the appropriate direction for the harvesting mode, against the force of a first spring by means of a first electromagnet and into a second position, in which the hydraulic motor rotates in the opposite direction referred to the harvesting mode, against the force of a second spring by means of a second electromagnet. When a foreign object is detected by the foreign object detector, the control renders the first electromagnet currentless and at least briefly supplies the second electromagnet with a current, preferably for a relatively short time that is chosen such that the hydraulic motor just stops, but does not turn in the opposite direction.

The flow rate of the hydraulic fluid to and from the first actuator can be increased by connecting in parallel two valves that are both controlled synchronously by the control, wherein this additionally shortens the response time of the hydraulic pump when a foreign object is detected. The pressure for controlling the first actuator can still be buffered with a pressure accumulator.

As an alternative or in addition to the characteristics of Claim 1, it is proposed that the displacement of the hydraulic motor can be varied with a second actuator that is connected to the control. In comparison with a hydraulic motor that has a fixed displacement, the variability of the hydraulic motor makes it possible to realize higher conveying speeds of the infeed conveyor by moving the swash plate of the hydraulic motor into a position below the maximum value by means of the second actuator. When the foreign object detector responds and detects a foreign object, the control causes the first actuator to adjust the hydraulic pump to a displacement of zero and the second actuator to preferably increase the displacement of the hydraulic motor to the maximum value, particularly if it lies below a predetermined value that preferably also consists of the maximum value at the time the foreign object detector responds. Since the hydraulic pump still conveys a certain quantity of the hydraulic fluid after the foreign object detector responds and the angle, by which the hydraulic motor continues to turn due to this quantity, is inversely proportional to the displacement of the hydraulic motor, the proposed increase of the displacement or its adjustment to the maximum value by the control results in the smallest possible residual angle of rotation of the hydraulic motor after the foreign object detector responds. In this case, the actuators and the valves for the hydraulic pump and the hydraulic motor preferably also operate electro-hydraulically although it would also be conceivable to provide actuators in the form of electromagnets and valves in the form of electronic switches.

The hydraulic pump and the hydraulic motor are preferably arranged within a closed hydraulic circuit, i.e., the outlet of the hydraulic pump is directly connected to the inlet of the hydraulic motor and vice versa. Since the hydraulic pump is pivoted back and the hydraulic motor is adjusted, if applicable, to a larger displacement, a pressure that decelerates the hydraulic motor is build up in this closed hydraulic circuit downstream of the hydraulic motor. Consequently, valves that are connected to the control and actuated by the foreign object detector are not provided in this case. The infeed conveyor is stopped due to the adjustment of the actuator of the hydraulic pump and, if applicable, the actuator of the hydraulic motor only.

EXEMPLARY EMBODIMENT

Figure 2:
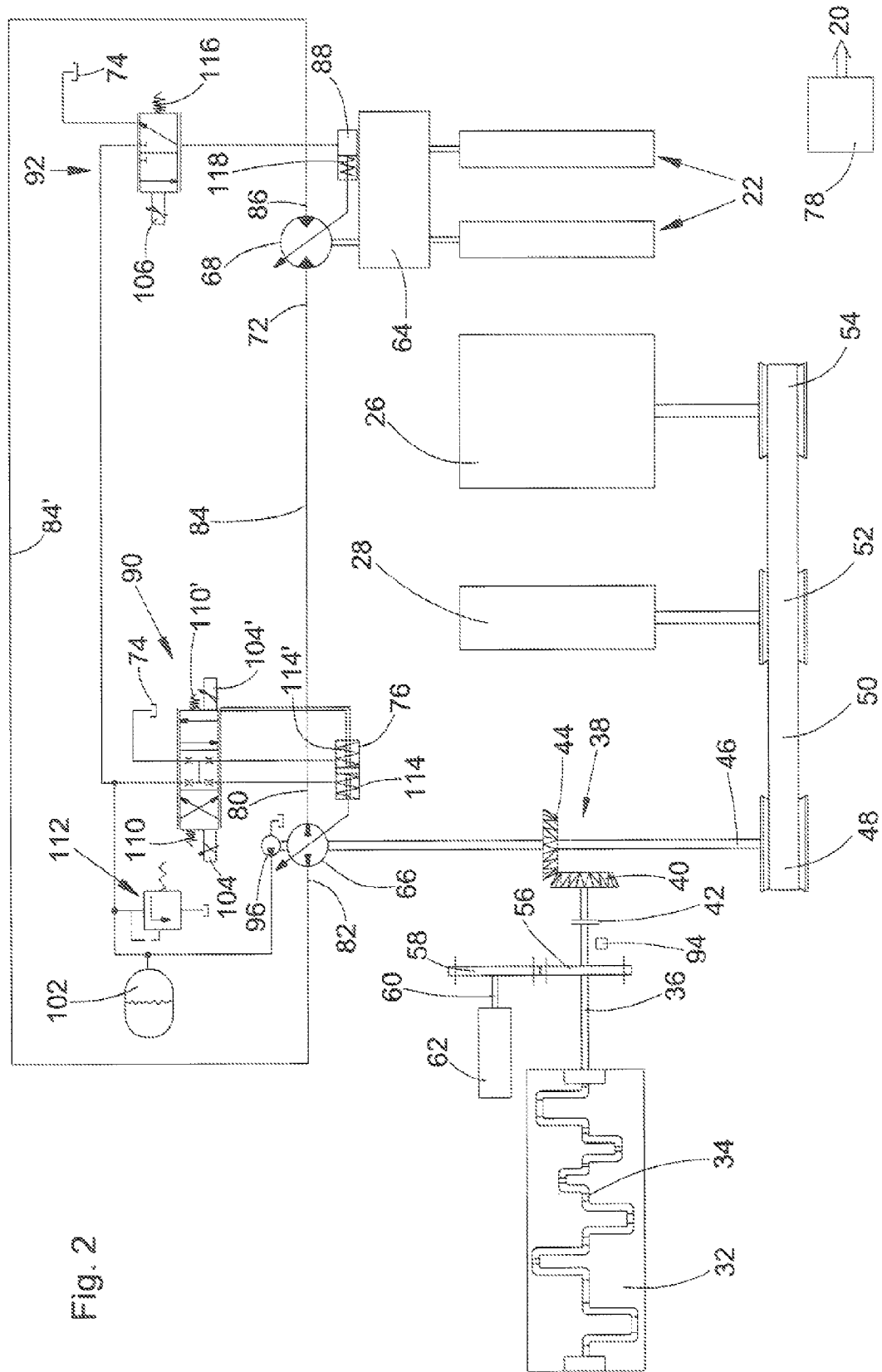

One exemplary embodiment of the invention is described with reference to the drawings. In these drawings:

FIG. 1 shows a schematic side view of a self-propelled harvester in the form of a forage harvester, and FIG. 2 shows a schematic top view of the drive system for the infeed conveyor of the harvester and the corresponding hydraulics.

FIG. 1 shows a schematic side view of a harvester 10 in the form of a self-propelled forage harvester. The harvester 10 is composed of a frame 12 that is carried by driven front wheels 14 and steerable rear wheels 16. The harvester 10 is operated from a driver's cab 18, from which a harvesting attachment 20 in the form of a pick-up is visible. Crop material such as, e.g., grass or the like is picked up from the ground by means of the harvesting attachment 20 and fed to a chopping device 26 that is arranged underneath the driver's cab 18 and realized in the form of a chopping drum, namely by means of an infeed conveyor 22 with pre-compression rollers that are arranged within an infeed housing 24 on the front side of the forage harvester 10, wherein said chopping drum chops the crop material into small pieces and deposits these small pieces on a conveying device 28. The material is transferred from the harvester 10 to a transport vehicle driving next to the harvester via a discharge shaft 30 that is rotatable about an approximately vertical axis and adjustable with respect to its incline. In the following description, directional terms such as lateral, bottom and top refer to the forward direction V of the harvester 10 that extends toward the right in FIG. 1.

FIG. 2 shows a top view of the drive arrangement of the harvester 10. An internal combustion engine 32, particularly in the form of a diesel engine, is situated in the rear region of the harvester 10 and connected to the longitudinal beams and/or crossbeams of the frame 12. Referred to the forward direction of the harvester 10, the internal combustion engine 32 extends up to approximately the rear end of the frame 12 and comprises a crankshaft 34 that forwardly extends out of the crankcase of the internal combustion engine 32. The crankshaft 34 drives a horizontally and forwardly extending output shaft 36. In contrast to this figure, the harvester 10 may also feature more than one internal combustion engine 32 such that the available driving power can be varied by also starting the second internal combustion engine and/or switching over to a second internal combustion engine with lower or identical or higher output.

On its front end, the output shaft 36 is connected to an angular gear 38 that is composed of a first conical gearwheel 40 that is connected to the longitudinal shaft 36 via a clutch 42 and a second conical gearwheel 44 that meshes with the first conical gearwheel 40. The rotational axis of the second conical gearwheel 44 extends horizontally and transverse to the forward direction. The second conical gearwheel 44 is connected to a shaft 46 that drives a pulley 48. A driving belt 50 is wrapped around the pulley 48, as well as a pulley 52 for the drive of the conveying device 28 and a pulley 54 for driving the chopping device 26. The angular gear 38, the shaft 46, the pulleys 48 and 54 and the driving belt 50 form a drive train that connects the output shaft 36 to the chopping device 26. Other elements of the drive train such as gears, belts and the like naturally may also be arranged between the clutch 42 and the output shaft 36. The internal combustion engine 32 can furthermore be arranged transverse to the driving direction such that the angular gear 38 is eliminated. The clutch 42 does not have to consist of a friction clutch with disks as shown, but could also be realized in the form of a belt drive that can be loosened and tightened or in any other way.

Between the clutch 42 and the crankcase of the internal combustion engine 32, the longitudinal shaft 36 carries a circumferentially toothed gearwheel 56 that meshes with another gearwheel 58 that drives the pump unit 62 via a shaft 60, wherein said pump unit serves for supplying hydraulic motors for driving the wheels 14, 16 and other hydraulically driven components of the harvester 10.

In the embodiment shown, the shaft 46 is permanently and functionally connected to a hydraulic pump 66 with variable displacement and flow direction. In another embodiment that is not illustrated in the figures, a shift transmission arranged between the shaft 46 and the hydraulic pump 66 makes it possible to couple a reversing motor to the shaft 46 instead of a hydraulic pump 66 in order to drive the chopping device 26 in the opposite direction referred to the harvesting mode while the clutch 42 is disengaged and to sharpen its blades by means of a grinding device 100.

The hydraulic pump 66 is connected and conveys hydraulic fluid to a hydraulic motor 68 in a closed circuit, wherein said hydraulic motor has a variable displacement and drives the pre-compression rollers of the inked conveyor 22 via a gear 64. An additional hydraulic motor 78 serves for driving the driven elements of the harvesting attachment 20 that may also consist of a mower attachment for harvesting corn or for producing whole crop silage. The additional hydraulic motor 78 is driven by a pump of the pump unit 62.

An inlet 80 of the hydraulic pump 66 and an outlet 72 of the hydraulic motor 68 are directly connected to one another, i.e., without inserting valves or the like, via a first pressure line 84. An outlet 82 of the hydraulic pump 66 and an inlet 86 of the hydraulic motor 68 are directly connected to one another, i.e., without inserting additional valves or the like, via a second pressure line 84'.

A control 70 (see FIG. 1) controls a first actuator 76 by means of a first electromagnetic valve 90 in the form of a proportional valve, the position of which is controlled with a pair of electromagnets 104, 104' that are electrically connected to the control 70, wherein this first actuator consists of a double-action hydraulic cylinder in the form of a double rod cylinder and influences the flow rate and flow direction of the hydraulic pump 66. The control 70 furthermore controls a second actuator 88 by means of a second electromagnetic valve 92, the position of which is controlled with an electromagnet 106 that is electrically connected to the control 70, wherein this second actuator consists of a single-action hydraulic cylinder and varies the displacement of the hydraulic motor 68 between a minimum and a maximum displacement. On the input side, the valves 90, 92 are on the one hand connected to a pump 96 that makes available the pressure for adjusting the swash plates of the hydraulic pump 66 and of the hydraulic motor 68 and the pressure of which is buffered by a pressure accumulator 102 and on the other hand connected to a reservoir 74 for hydraulic fluid. The pump 96 is also driven by the shaft 46 and may be arranged in the housing of the hydraulic pump 66 or forms part of the pump unit 62. The pressure made available by the pump 96 is limited by a pressure control valve 112 and sufficiently high for adjusting the actuators 88 and 76 with adequate speed, wherein the pressure accumulator 102 ensures the volume flow required for this purpose. The two valves 90, 92 consist of proportional valves. In order to accelerate the adjustment of the hydraulic pump 66, another (not-shown) first valve of the same type could be connected in parallel to the first valve 90 and actuated synchronous with this first valve by the control 70. The pressure accumulator 102 (or another not-shown pressure accumulator) could also be connected to the line that is drawn on the right and leads to the actuator 76 downstream of the valve 90. As a rule, the actuator 76 and preferably also the valve 90 are integrated into the housing of the hydraulic pump 66 while the actuator 88 and preferably also the valve 92 are analogously integrated into the housing of the hydraulic motor 68. Instead of the electro-hydraulic adjustment of the hydraulic pump 66 and/or the hydraulic motor 68 shown, it would also be possible to utilize a purely electromagnetic adjustment.

The control 70 is also connected to an actuator 94 that engages and engages the clutch 42, to an operator input device 98 arranged in the driver's cab 18 and to a foreign object detector 108. The latter is situated in the lower front infeed roller of the infeed conveyor 22 and detects ferromagnetic objects contained in the crop material mat being fed into the harvester. It would alternatively or additionally also be possible to utilize any other foreign object detector that, for example, reacts to the sound produced by impacting rocks and/or to abruptly increasing throughputs that are detected based on the position of an upper roller of the infeed conveyor 22 or operates on the basis of electromagnetic waves that penetrate the crop material mat.

The operator input device 98 enables the operator to select a (road) driving mode, in which the clutch 42 is disengaged and neither the chopping device 26 nor the infeed conveyor 22 is driven because the hydraulic pump 66 is also at a standstill. The additional hydraulic pump 78 and therefore the harvesting attachment 20 are also not driven in this case. The wheels 14 and, if applicable (all-wheel drive), 16 are driven by their hydraulic motors and the pump unit 62.

The operator input device 98 furthermore enables the operator to select a harvesting mode, in which the clutch 42 is engaged and the chopping device 26 and the conveying device 28 are driven by means of the driving belt 50. In this case, the shaft 46 also drives the hydraulic pump 66 that acts upon the hydraulic motor 68 driving the infeed conveyor 22 via the line 84'. The harvesting attachment 20 is driven by the pump unit 62 with the aid of the additional hydraulic motor 78. The actuators 76, 88 are controlled by the control 70 with the aid of the electromagnets 104 and 106 assigned to the valves 92, 92 in such a way that a desired cutting length of the chopped material results, wherein said cutting length can be input on the operator input device 98 or automatically predetermined by the control based on measured values of sensors that sense certain properties of the chopped material such as moisture or compressibility. The displacement of the hydraulic motor 68 preferably is adjusted to the respectively highest value possible for achieving the desired cutting length and the displacement of the hydraulic pump 66 is correspondingly adapted in order to achieve the highest torque possible of the infeed conveyor 22. In comparison with a hydraulic motor with fixed displacement, the variability of the hydraulic motor 68 makes it possible to achieve faster conveying speeds of the infeed conveyor 22 and therefore shorter cutting lengths by adjusting the swash plates of the hydraulic motor 68 to a position below the maximum value with the aid of the actuator 92.

In the harvesting mode, the electromagnet 104 of the valve 90 of the hydraulic pump 66 is supplied with a current and pulls the valve 90 toward the left against the force of a first spring 110', namely into a position, in which the actuator 76 adjusts the swash plate of the hydraulic pump 66 to a position, in which the hydraulic pump 66 conveys hydraulic fluid to the inlet 86 of the hydraulic motor 68 through the outlet 82 and the line 84', wherein said hydraulic fluid then flows from the outlet 72 of the hydraulic motor 68 to the inlet 80 of the hydraulic pump 66 through the line 84. Consequently, the terms inlet and outlet refer to the flow direction of the hydraulic fluid in the harvesting mode. In the harvesting mode, the electromagnet 104' remains currentless (but the electromagnet 106, if applicable, is supplied with a current). The operator is able to stop the hydraulic motor 66 after the harvesting mode by means of the operator input device 98; wherein this merely requires the control to render the electromagnet 104 currentless such that the valve 90 is moved into the neutral position by the spring 110', whereupon the actuator 76 is also moved into the neutral or center position, in which the volumetric displacement of the hydraulic pump 66 is zero, by the force of an integrated spring 114'. The operator input device 98 also makes it possible to select a reversing mode, in which the infeed conveyor 22 is driven in the opposite direction referred to the harvesting mode. In this case, the control 70 merely supplies a current to the electromagnet 104' that pulls the valve 90 toward the right against the force of a second spring 110, namely into a position, in which the actuator 76 moves the swash plate of the hydraulic pump 66 to a position, in which the hydraulic pump 66 conveys hydraulic fluid to the hydraulic motor 68 through the line 84, wherein said hydraulic fluid subsequently flows back to the hydraulic pump 66 through the line 84'. The electromagnet 104 remains currentless in the reversing mode. At the end of the reversing mode, the control 70 renders the electromagnet 104' currentless such that the valve 90 is moved into the neutral position by the spring 110, whereupon the actuator 76 is also moved into the neutral or center position, in which the volumetric displacement of the hydraulic pump 66 is zero, by the force of an integrated spring 114.

It should be noted that the pressure in the lines 84, 84' is limited by means of (not-shown) pressure control valves, and that the lines 84, 84' can be supplied with sufficient quantities of hydraulic fluid by means of additional (not-shown) valves. In this respect, we refer to the initially cited state of the art.

If the foreign object detector 108 detects a foreign object in the infeed conveyor 22 during the harvesting mode and transmits a corresponding signal to the control 70, the control 70 immediately renders the electromagnet 104 currentless such that the spring 110' has the tendency to move the valve 90 and therefore also the actuator 76 into the neutral position. This process is accelerated by simultaneously supplying the electromagnet 104' with a current for a limited time. The flow of hydraulic fluid in the line 84 therefore is instantly stopped. In FIG. 2, the valve 90 is accordingly moved into the right position. The second electromagnet 104' is supplied with a current for exactly such a period of time that the hydraulic motor 68 comes to a standstill, but does not yet turn in the opposite direction.

The control 70 simultaneously causes the electromagnet 106 to switch the valve 92 into the position, in which the actuator 88 moves the swash plate of the hydraulic motor 68 to a position of maximum displacement if it is not already situated in this position. It is preferred (in contrast to FIG. 2) to act upon the electromagnet 106 with the maximum electric current in the position of maximum displacement such that the valve 92 is actively switched into the open position and the pressure of the pump 96 then actively moves the actuator 88 into the desired position against the force of a spring 118 integrated into the actuator 88. However, it would also be conceivable to realize a different variation, in which a spring 116 moves the valve 92 into a closed position in order to reach a maximum displacement of the hydraulic motor 68 and/or the spring 118 moves the actuator 88 and the swash plates of the hydraulic motor 68 into a position of maximum displacement.

Due to the activation of the electromagnet 104', only little hydraulic fluid any longer flows through the line 84 after the foreign object detector 108 responds, wherein this flow only allows the hydraulic motor 68 to additionally turn by a minimal angle due to the adjustment of the maximum displacement. Since the swash plate of the hydraulic pump 66 is pivoted back, an additional pressure is build up in the closed hydraulic circuit downstream of the hydraulic motor 68 and decelerates the hydraulic motor 68. Consequently, the infeed conveyor 22 stops sufficiently fast for preventing the foreign object from damaging the chopping device 26.

Subsequently, the control 70 can cause the electromagnets 104' and, if applicable, 106 to produce a hydraulic flow in the line 84 and to drive the hydraulic motor 68 in the opposite direction referred to the harvesting mode, namely either automatically or in response to an input of the operator on the operator input device 98, such that the infeed conveyor 22 is reversed in order to eject the foreign object again. The additional hydraulic motor 78 simultaneously reverses the drive of the harvesting attachment 20. After the reversing process, the examination of the ejected crop material by the operator and the operator's confirmation that the foreign object has been removed, a corresponding input on the operator input device 98 causes the control 70 to resume the normal harvesting mode.

The invention claimed is:

1. A drive system for an infeed conveyor of a harvester, comprising: an adjustable hydraulic pump, the flow rate and flow direction of which can be adjusted by means of a first actuator that can be controlled with a first valve, a hydraulic motor that is connected to the hydraulic pump via a hydraulic fluid conduit and functionally connected to the infeed conveyor, and a control that is connected to a first valve and a foreign object detector and can be operated in such a way that it causes the first actuator to adjust the flow rate of the hydraulic pump to zero by means of the first valve when a foreign object is detected by the foreign object detector, characterized by the fact that the control is designed for at least briefly controlling the first valve in the sense of a reversal of the flow direction when a foreign object is detected by the foreign object detector, wherein the control can be operated in such a way that the first valve is controlled in the sense of a reversal of the flow direction for a period of time that is chosen such that the hydraulic motor instantly stops, but does not turn in the opposite direction.

2. A drive system for an infeed conveyor of a harvester, particularly according to one of the preceding claims, comprising: a hydraulic pump, the flow rate of which can be varied by means of a first actuator, a hydraulic motor that is connected to the hydraulic pump via a hydraulic fluid conduit and functionally connected to the infeed conveyor, and a control that is connected to the first actuator and a foreign object detector and can be operated in such a way that it causes the first actuator to adjust the flow rate of the hydraulic pump to zero when a foreign object is detected by the foreign object detector, characterized by the fact that the hydraulic motor has a displacement that can be varied by means of a second actuator that is connected to the control, and by the fact that the control can be operated in such a way that it causes the second actuator to increase the displacement of the hydraulic motor, preferably to the maximum value, when a foreign object is detected by the foreign object detector, wherein the control can be operated in such a way that, when a foreign object is detected by the foreign object detector, it only causes the second actuator to increase the displacement of the hydraulic motor if it lies below a predetermined value, particularly the maximum value, at the time the foreign object detector responds.

* * * * *